United States Patent [19]

Bayha

[11] 4,056,731

[45] Nov. 1, 1977

[54] RETICLE PROTECTIVE STRUCTURE AND RADIATION SENSITIVE VALIDATION APPARATUS

[75] Inventor: Jack E. Bayha, Adrian, Mich.

[73] Assignee: ARDAC/USA, Chesterland, Ohio

[21] Appl. No.: 636,719

[22] Filed: Dec. 1, 1975

Related U.S. Application Data

[63] Continuation of Ser. No. 413,428, Nov. 7, 1973, which is a continuation of Ser. No. 159,917, July 6, 1971, abandoned.

[51] Int. Cl.[2] ........................ G06K 5/00; G06K 11/00

[52] U.S. Cl. .................................... 250/556; 250/571; 250/239; 209/DIG. 2

[58] Field of Search ............... 250/571, 572, 555, 556, 250/569, 570, 239, 216; 209/DIG. 2, 111.6, 111.7

[56] References Cited

U.S. PATENT DOCUMENTS

| | | | |
|---|---|---|---|
| 3,457,421 | 7/1969 | Bayha | 356/71 X |
| 3,564,268 | 2/1971 | Bayne | 250/556 |
| 3,581,100 | 5/1971 | Milford | 250/216 |

*Primary Examiner*—Alfred E. Smith
*Assistant Examiner*—David K. Moore
*Attorney, Agent, or Firm*—Oldham & Oldham Co.

[57] ABSTRACT

The reticle of a paper currency validating device of the type which uses a radiation sensing system is protected by the provision of a thin sapphire disc covering the reticle.

4 Claims, 3 Drawing Figures

INVENTOR
JACK E. BAYHA
BY
Oldham & Oldham
ATTORNEYS

RETICLE PROTECTIVE STRUCTURE AND RADIATION SENSITIVE VALIDATION APPARATUS

This is a continuation of application Ser. No. 413,428, filed on Nov. 7, 1973, which is in turn a continuation of application Ser. No. 159,917, filed on July 6, 1971, now abandoned.

The present invention relates to paper currency validating devices of the type in which the validity of the currency is determined by the use of either light or infra-red radiation which is reflected off or passed through a portion of the currency and subsequently through a reticle which is provided with a grid pattern and subsequently sensing the resulting radiation pattern during relative movement between the bill and the reticle. The reticle grid has a line spacing which corresponds to the spacing of a portion of the engraved background lines of a valid piece of currency and when a valid piece of currency is passed through the sensor an alternate light and dark radiation pattern will be generated. Counterfeit bills or currency do not generate the same pattern. Such a validation device is shown in U.S. Pat. No. 3,457,421, issued July 22, 1969, for "Radiation Sensitive Paper Security Validation Apparatus".

For the proper operation of such validation equipment it is important that the reticle be placed close to the surface of the currency. However, paper is highly abrasive. As a result, the reticle is gradually scratched and worn away by the action of the pieces of currency moving through the sensing device. Frequent replacement of the reticle is thus necessary to maintain the operating ability of the device.

It is the primary object of the present invention to provide means for protecting the reticle of a paper currency validating device to prevent its being abraded or worn away by the action of paper currency passing through the sensing device.

It is a further object of the present invention to provide a protecting means for the reticle which does not adversely effect the sensitivity of the sensing device.

The above and other objects of the invention which will become apparent in the following detailed description are achieved by providing, on the face of the reticle, a thin sapphire disc.

For a more complete understanding of the invention and the objects and advantages thereof, reference should be had to the following detailed description and the accompanying drawing wherein there is shown a preferred embodiment of the invention.

Figure 1:
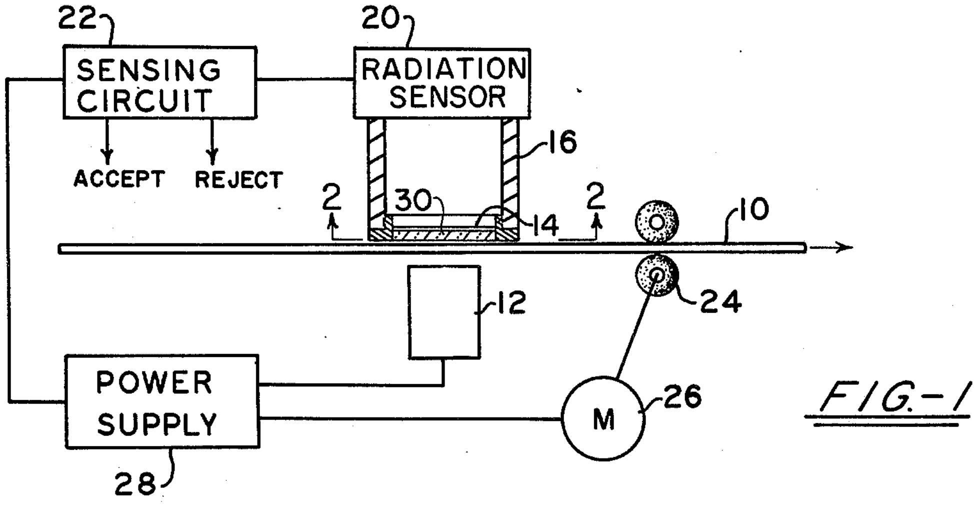
FIG. 1 is a highly schematic showing of a paper currency validating device which incorporates the reticle protective structure of the present invention.
Figure 2:
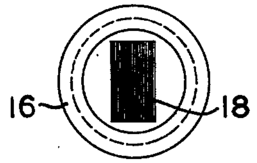
FIG. 2 is a bottom plan view of the reticle structure of FIG. 1, taken along the line 2—2 thereof.

The validation device illustrated schematically in FIGS. 1 and 2 is adapted to test a piece of paper currency 10 to determine the authenticity thereof. A radiation source 12 is pro vided to project either light or infra-red radiatiion through a portion of the currency 10. The radiation passing through the piece of currency 10 then passes through a reticle 14 carried by a housing 16. The reticle 14 is provided with a grid pattern 18. The spacing of the lines of the grid pattern 18 is identical to the spacing of the lines on a portion of the bill 10, for example, the background engraving surrounding a portrait on a dollar bill. The radiation passing through the piece of currency 10 and the grid 18 of the reticle 14 actuates a radiation sensor 20 which produces an electrical signal corresponding to the radiation pattern. This signal is transmitted to a sensing circuit 22 which determines if the radiation pattern corresponds to that of a valid piece of currency. When the test area of a valid piece of currency is moving across the reticle 14 the lines of the grid 18 will alternately move into and out of registry with the lines on the test area of the currency producing clearly defined radiation pulses. Any other piece of currency, either one of a different denomination or a counterfeit bill, will not produce this clearly defined series of pulses. Movement of the bill 10 may be effected by the drive rolls 24 connected to the motor 26. A power supply 28 and suitable controls, not shown, are provided for the radiation source 12, sensing circuit 22 and drive motor 26.

Due to the abrasive action of the paper currency 10 the reticle 14 would rapidly become scratched or marred if not protected. The abrasion of the reticle 14 will ultimately destroy the grid pattern 18, thus rendering the device inoperative.

In order to protect the reticle 14 and to prevent its being damaged by the abrasive action of the paper currency 10, the present invention invisions the provision of a protective cover 30 disposed between the reticle 14 and the paper currency 10. Since the protective cover 30 is in the path of the radiation passing through the piece of currency, it must be highly transparent to such radiation. Sapphire is very transparent to infra-red radiation and to light in the band from 0.17 to 6.0. Sapphire also has an MOH scale hardness of 9, immediately adjacent to that of diamond and, therefore is highly resistant to abrasion. Synthetic sapphire can be manufactured to a thickness of only 0.003 inch. The present invention thus contemplates that the protective cover 30 will be a sapphire or synthetic sapphire disc, preferably of a thickness of 0.003 inch. Since the sapphire disc 30 is extremely hard it is not abraded or marred as the pieces of currency move across it and the effective life of the reticle 14 is thus prolonged indefinitely.

Figure 3:
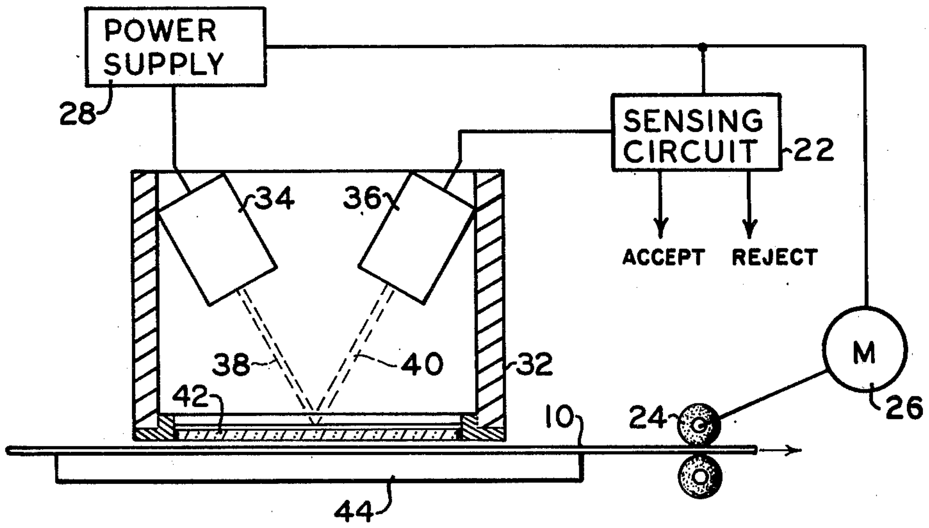
FIG. 3 is a highly schematic showing of a second type of currency validating device which also incorporates the reticle protective structure of the present invention.

As is shown in FIG. 3, the use of a transparent protective disc is not limited to validating devices of the type in which radiation is passed through the document being examined. In this embodiment, there is provided a housing 32 which supports a radiation source 34 and a radiation detector 36. The source 34 projects a beam of radiation along an axis 38 at an acute angle to the surface of the document 10 which is being examined and the radiation reflected along a second axis 40 from the document surface is sensed by the detector 36 to actuate the sensing circuit 22. In order to maintain proper positioning of the surface of the document 10 relative to the axis 38 and 40, the document is supported by a tray 44 and is passed beneath a transparent plate 42 on the lower end of the housing 32. This plate 42 may be made of sapphire as taught by the present invention to provide a long lasting durable surface which is virtually uneffected by the proper documents.

While only the best known embodiment of the invention has been illustrated and described in detail herein, it will be understood that the invention is not limited thereto or thereby. Reference should be therefore had to the appended claims in determining the true scope of the invention.

What is claimed is:

1. A paper document validating device comprising, a. a radiation source for projecting a beam of radiation onto a surface of the document, b. a radiation detector spaced from the document and disposed so as to receive the portion of the radiation coming from the document, c. a very thin reticle having a plurality of precisely spaced markings on one surface thereof, d. an elongated tubular member associated with the radiation detector, e. said reticle located between and apart from said radiation source and in association with the detector and the tubular member, f. said reticle markings being toward the surface of the document and obstructing the flow of radiation through the reticle, g. a protective cover of a thickness of approximately 0.003 inches positioned in contact with the document surface and in supportive contact with said reticle over the full surface thereof so that said reticle markings over the full surface thereof are positioned in parallel relation to the document surface and approximately 0.003 inches from the document, h. a separate frame mounting the reticle and protective cover in supportive juxtaposition and operatively connected to the end of the tubular member, i. said protective cover being of a material highly transparent to said radiation and highly resistant to abrasion, j. a detecting circuit for determining when the radiation passing to the detector corresponds to that passing through a valid piece of currency, and k. means for selectively effecting relative movement between said reticle and the document with the document in contact with the protective covering, and with the protective covering maintaining the parallel relation of the reticle to the document during such relative movement.

2. A paper document validating device as recited in claim 1 wherein movement between said reticle and the document produces clearly defined radiation pulses which are received by said radiation detector, said radiation detector producing electrical signals corresponding to the radiation pattern.

3. A paper document validating device as recited in claim 2 wherein said protective cover has an MOH scale hardness of nine (9).

4. A paper document validating device as recited in claim 3 wherein said protective cover is made of sapphire.

* * * * *